(12) United States Patent
Kucukcakar

(10) Patent No.: US 10,969,936 B2
(45) Date of Patent: *Apr. 6, 2021

(54) COLLABORATIVE PEER REVIEW SYSTEM AND METHOD OF USE

(71) Applicant: OpenNetReview, Inc., Mountain View, CA (US)

(72) Inventor: Kayhan Kucukcakar, Los Altos, CA (US)

(73) Assignee: OpenNetReview, Inc., Mountain View, CA (US)

(*) Notice: Subject to any disclaimer, the term of this patent is extended or adjusted under 35 U.S.C. 154(b) by 261 days.

This patent is subject to a terminal disclaimer.

(21) Appl. No.: 16/162,727

(22) Filed: Oct. 17, 2018

(65) Prior Publication Data

US 2019/0050119 A1 Feb. 14, 2019

Related U.S. Application Data

(63) Continuation of application No. 14/809,833, filed on Jul. 27, 2015, now Pat. No. 10,133,448.

(51) Int. Cl.

| G06F 17/30 | (2006.01) |
|---|---|
| G06F 3/0482 | (2013.01) |
| H04L 29/06 | (2006.01) |
| G06F 3/0484 | (2013.01) |
| G06F 16/28 | (2019.01) |
| G06F 16/951 | (2019.01) |
| G06F 16/9535 | (2019.01) |
| G06F 16/2457 | (2019.01) |
| G06Q 10/10 | (2012.01) |

(52) U.S. Cl.
CPC ........ *G06F 3/0482* (2013.01); *G06F 3/04842* (2013.01); *G06F 16/24578* (2019.01); *G06F 16/285* (2019.01); *G06F 16/951* (2019.01); *G06F 16/9535* (2019.01); *G06Q 10/10* (2013.01); *H04L 65/403* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 9,785,902 B1* | 10/2017 | Fontaine | G06Q 10/06312 |
|---|---|---|---|
| 2009/0164402 A1* | 6/2009 | Yahia | G06F 16/951 706/46 |
| 2012/0246580 A1* | 9/2012 | Bouverat | G06Q 50/01 715/753 |

(Continued)

*Primary Examiner* — Hung D Le
(74) *Attorney, Agent, or Firm* — Brad Bertoglio; Intelink Law Group, P.C.

(57) ABSTRACT

Disclosed is a system and method for providing poll-based reviews of various businesses and service providers. In particular, a reviewer provides a review by answering poll-based review questions and/or adding new poll-based review questions to provide the most relevant feedback. The review questions can be ranked in order of relevance and/or importance to each reviewer. The data from the review is summarized and presented so that information related to each reviewee is presented in order of preference to the reviewer. Additionally, the present invention gathers data from each reviewer by using polls to tailor suggestions for new reviewees to the reviewer.

20 Claims, 9 Drawing Sheets

(56) References Cited

U.S. PATENT DOCUMENTS

| | | | |
|---|---|---|---|
| 2013/0138644 A1* | 5/2013 | Yahia | G06Q 50/01 |
| | | | 707/733 |
| 2013/0283301 A1* | 10/2013 | Avedissian | H04N 21/4756 |
| | | | 725/5 |
| 2014/0068432 A1* | 3/2014 | Kucharz | G06Q 10/107 |
| | | | 715/716 |
| 2014/0150029 A1* | 5/2014 | Avedissian | G06F 3/04842 |
| | | | 725/60 |
| 2014/0258169 A1* | 9/2014 | Wong | G06Q 30/0282 |
| | | | 705/347 |
| 2014/0281917 A1* | 9/2014 | Alpern | G06F 40/14 |
| | | | 715/234 |
| 2014/0289161 A1* | 9/2014 | Johnson | G06Q 30/0282 |
| | | | 705/347 |
| 2015/0161686 A1* | 6/2015 | Williams | G06Q 30/0282 |
| | | | 705/347 |
| 2016/0189194 A1* | 6/2016 | Minicucci | G06Q 30/0226 |
| | | | 705/14.27 |

\* cited by examiner

TITLE:
ADD NEW POLL QUESTION — 199
* QUESTION [QUESTION]
* ANSWERS [ANSWER] — 200

YOUR RESPONSE WAS SAVED SUCCESSFULLY!

| | QUESTION | ADD QUESTION TO POLL |
|---|---|---|
| 1 | QUESTION NO. 1 | ANSWERS [A][B][C][D] |

REVIEW DATE: __/__/__    SUBMIT — 145
REVIEWER ROLE: PATIENT | PARENT | ANOTHER DOCTOR | ADMINISTRATOR

*ENTER FREE-FORM TEXT COMMENTS*

MOVE UP | MOVE DOWN — 151

IMPORTANCE
1. [x] QUESTION .......... YES | NO
2. [x] QUESTION .......... NO | YES
3. [x] QUESTION .......... NEVER | RARELY | SOMETIMES | FREQUENTLY
4. [x] QUESTION .......... YES | NO
5. [ ] QUESTION .......... NO | YES
6. [x] QUESTION .......... NEVER | RARELY | SOMETIMES | FREQUENTLY 147
148
149
150
152

192 WELCOME BACK JOHN DOE
193 YOU HAVE X MESSAGES

ANNOUNCEMENT
THERE IS A NEW REVIEW CATEGORY "CARS." GO TO CATEGORIES TO SEE.

194 QUICK POLL: WOULD YOU ANSWER A COUPLE OF QUICK QUESITONS TO MAKE OUR CONTENT BETTER?
QUESTION ......................... YES | NO
QUESTION ......................... YES | NO
[SEND]

| | | | | | |
|---|---|---|---|---|---|
| ☐ FOLLOW | 1MI | BRAZILIAN DUMPLINGS | DISCUSSION FORUM | WEBSITE | MAP SOME CITY, CA |
| ☐ FOLLOW | 1MI | A DAY CARE | DISCUSSION FORUM | WEBSITE | MAP SOME CITY, CA |
| ☐ FOLLOW | 3MI | B DAY CARE | DISCUSSION FORUM | WEBSITE | MAP SOME CITY, CA |
| ☐ FOLLOW | 10MI | C DAY CARE | DISCUSSION FORUM | WEBSITE | MAP SOME CITY, CA |

COLLABORATIVE PEER REVIEW SYSTEM AND METHOD OF USE

FIELD OF THE INVENTION

The present invention generally relates to a system and method for gathering and publishing reviews and ratings for suppliers of goods and services. More particularly, the present invention is directed to open-source polling that can display reviews in a tailored manner to show most relevant reviews to users.

BACKGROUND OF THE INVENTION

Various types of websites for posting reviews and conducting surveys exist in the prior art. For instance, some online shopping websites include consumer ratings and customer reviews for specific goods and products. Other websites include crowd-sourced reviews of local businesses for specific services. Generally, these reviews are based on a star system (e.g., five out of five stars, four out of five stars, etc.) or simply based on the number of consumers who approve of the goods or services (e.g., number of "likes").

However, the star ratings are too generic without much context associated therewith. Additionally, it is difficult to give meaningful weight to these reviews with a consistent scale because one reviewer's three star rating may be equivalent to another reviewer's five star rating. While some reviews are coupled with comments or textual feedback for providing support to said rating, these comments are often unstructured and time consuming to read and write. Furthermore, the textual feedback are lost or made less visible when more recent feedback is posted. In this regard, there is a need in the prior art for a collaborative review system that provides users with consistent and accurate information and that prioritizes most relevant reviews about goods and services.

SUMMARY OF THE INVENTION

In view of the disadvantages inherent in the known types of methods and systems for creating and publishing peer reviews now present in the prior art, the present invention provides an improved customer review system wherein the same can be utilized for creating poll-based reviews and enhancing consumer knowledge.

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

In one embodiment, the present invention comprises a plurality of electronic devices, each of the devices having a processor, storage units, and a communication module for connecting to the Internet. The devices are in communication with at least one server over a network. The server comprises a processing means and one or more database. The method includes operating with the devices to create, upload, monitor, access, and/or provide reviews on a website for goods/services provided by retailers, restaurants, professional service providers, and the like. The present invention allows the users to provide reviews by answering poll-based review questions, wherein the poll-based review questions are ranked by the user in order of importance, popularity, or relevance, among other factors. The users can also add review questions to be answered by other users to provide most relevant feedback. The results from the review questions are then used to rank or rate the merchant or the service provider reviewed.

The website also takes polls to gather information about the users. Without limitation, the information gathered from the polls may comprise demographic information and information about the user's preferences. The results from the polls are used to provide tailored suggestions for merchants or professional service providers to the user. In addition, the present invention is directed not only to a website operated by a host computer or a server, but also to an application contained in a computer-readable medium containing instructions for the host computer or the server to perform the aforesaid functions.

It is therefore an object of the present invention to provide a collaborative review system that is poll-based to expedite the reviewing process while being accurate.

It is another object of the present invention to provide a collaborative review system that comprises open-source polling so as to allow users to add questions.

It is still another object of the present invention to provide a collaborative review system that displays review metrics that is unique for each user.

It is still another object of the present invention to provide a collaborative review system that provides suggestions for searches based on factors such as a user's profile, likes, preferences, and search history, among others.

It is still another object of the present invention to provide a collaborative review system that provides reviews that are most relevant to a user.

A final object of the present invention is to provide a collaborative review system that is accurate and reliable.

In the light of the foregoing, these and other objects are accomplished in accordance of the principles of the present invention, wherein the novelty of the present invention will become apparent from the following detailed description and appended claims.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which:

FIG. 3 shows an exemplary web page for entering polls.

FIG. 4 depicts an exemplary web page for entering new poll questions.

FIG. 5 shows an exemplary web page for base category definition.

FIG. 6 shows an exemplary web page for entering poll-based reviews and entering review ranking.

FIG. 9 shows another exemplary web page for providing general suggestions based on reviewer preferences.

DETAILED DESCRIPTION OF THE INVENTION

The present invention is directed towards a collaborative review system. For purposes of clarity, and not by way of limitation, illustrative views of the present review system are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be, but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or." Additionally, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through the use of artificial intelligence techniques.

Figure 1:
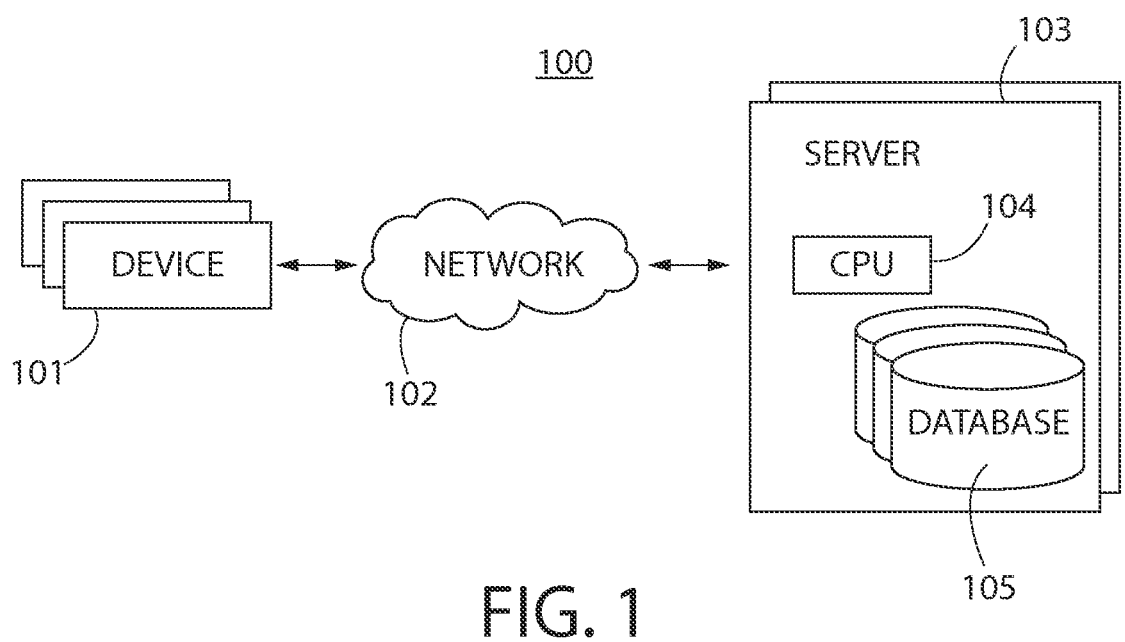
FIG. 1 depicts a computer system according to one embodiment of the present invention.

Referring now to FIG. 1, there is shown a computer system according to one embodiment of the present invention. The system 100 comprises one or more data enabled devices 101 having Internet network access capabilities such as computers, tablet computers, mobile phones, personal digital assistants (PDAs), portable media players, and the like. The devices 101 are used by reviewees and reviewers to access, create, upload, and/or search for reviews via a website, an application, or a mobile application from the front end of the system. The term "reviewee" is defined herein as a person or an entity such as a merchant or a restaurant that provides goods and/or professional services and that is being reviewed. The term "reviewer" is defined herein as a person, preferably a consumer, a customer, or a user who reviews or provides feedback to the reviewee. It is contemplated that each of the reviewees and the reviewers is prompted to register for an account via the website, web application, or the mobile application.

The back end of the system 100 comprises one or more servers 103. Each of the devices 101 is in communication with one or more servers 103 in a network 102. Each of the servers 103 comprises a central processing unit (CPU) 104 and at least one database 105. The servers 103 can be used manage the website, web application, and/or the mobile application. Additionally, the device 101 sends or requests information via wireless transmission to the server 103 in operation. In response, the server 103 stores the received information in the database 105 or retrieves relevant information from the database 105. For example, a reviewer can submit a review from his or her mobile device, and the server 103 can store the review in its database 105.

Figure 2:
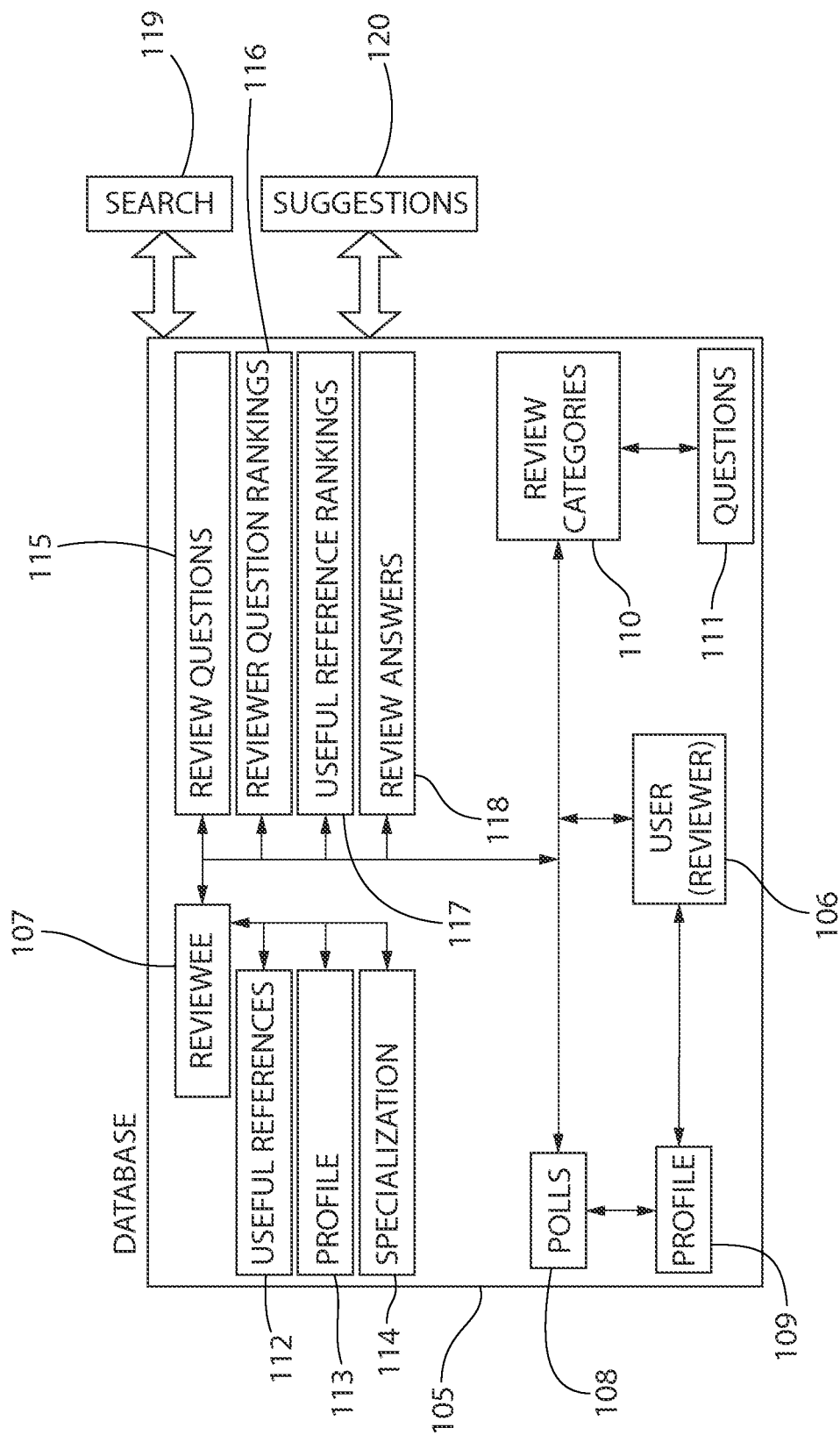
FIG. 2 depicts an exemplary block diagram illustrating the inner workings of a database of the present invention.

Referring now to FIG. 2, there is shown an exemplary block diagram illustrating the inner workings of the database 105 of the present invention. The database retrieves and stores information associated with search queries 119 and search suggestions 120. In the illustrated embodiment, the database 105 comprises at least two sets of data: the first set for a reviewee 107; and the second set for the reviewer 106. The first set of data includes profile information 113 for each of the reviewees 107. Without limitation, the profile information 113 may comprise the reviewee's name, contact information, hours of operation, and the like. Additionally, the database 105 comprises information about the type of goods and/or services that the reviewee 107 provides so as to identify the reviewee's category. Preferably, the database categorizes the reviewee by specialization 114 or industry so that information associated with the reviewees 107 is stored in an organized manner.

The first set of data further comprises review questions 115, review answers 118, reviewer question rankings 116, useful references 112, and useful reference rankings 117 associated with each of the reviewees 107 in the system. The review questions 115 and answers 118 pertain to feedback for goods and/or services provided by the reviewee 107. The reviewer question rankings 116 pertain to how each review question was ranked by the reviewers 106. The useful reference rankings 117 and useful references 112 provide useful references such as third party websites pertaining to the product and/or service area of the reviewee 107.

The second set of data includes profile information 109 for each of the reviewers 106 with a registered account in the system. In one embodiment, profile information 106 comprises reviewer profile abstracted information, poll profile, and review profile. In this regard, the profile information 106 encompasses the reviewer's preferences and other unique information pertaining to the reviewer. Without limitation, the reviewer profile abstracted information includes demographic information such as name, contact information, and the like. The poll profile comprises information about each of the reviewers derived from polls 108. Without limitation, the polls 108 may gather information about the reviewer's opinions, preferences, household income, and the like. The database comprises review categories 110 and questions 111 associated with the review categories 110. Additionally, the review profile is based on the reviews provided by the reviewer. The review profile may be organized and/or broken down by each category used in the reviews, each classification, and/or each question. For example, the category may comprise a restaurant, the classification may comprise a fast food restaurant, and the question may comprise cost.

Information from the database is used to generate review summary rating. More specifically, each answer for each review questions 115 is given a star rating based on how desirable the question is to the individual reviewer. It is preferred that the most desired question is ranked the highest and the least desired question is ranked the lowest. The star rating for each answer is averaged and then the overall summary rating is calculated from the average. Because the present invention allows the reviewers to add review questions, not every review has the same set of questions and answers and not every reviewer answers the same set of questions and answers.

Figure 3:
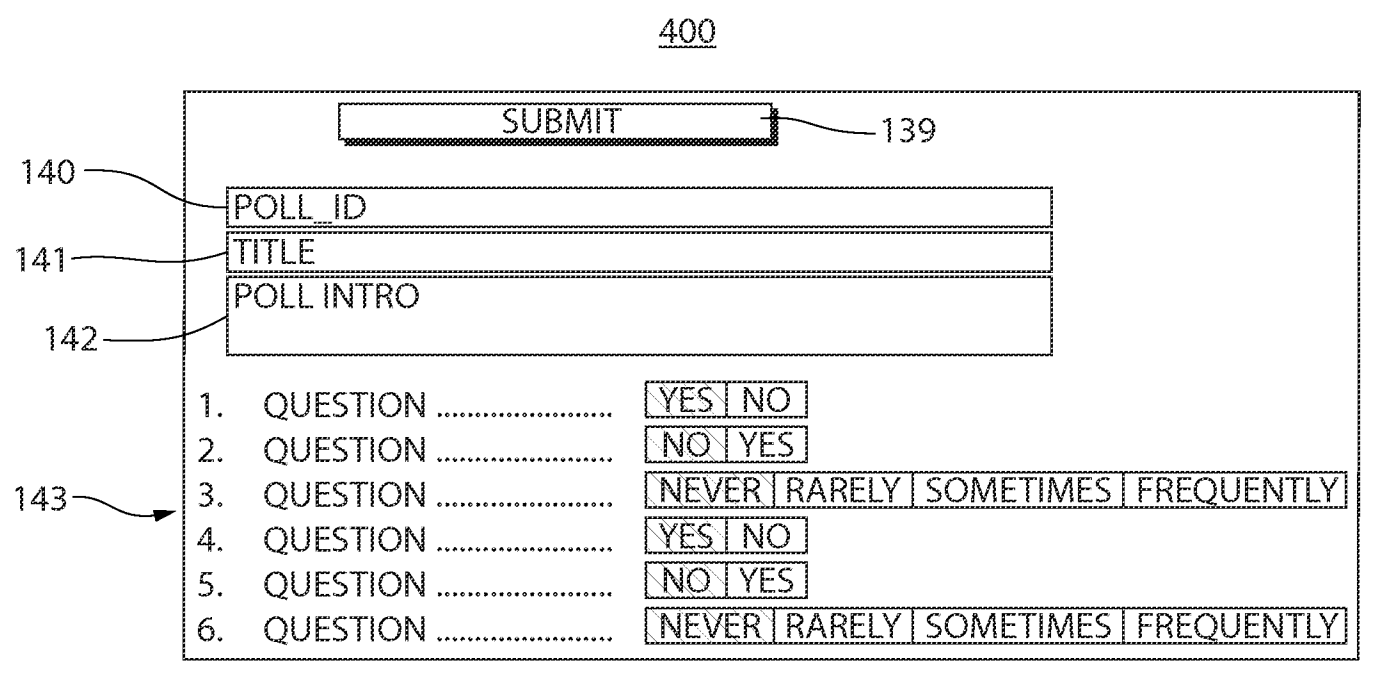

FIGS. 3 and 4 show exemplary web pages 400, 900 for filling out polls and for entering new questions for open-source polls. In one embodiment, the graphic user interface (GUI) for filling out polls with a data enabled devices includes a poll identification name or number 140; a poll title 141; and introduction or a brief description 142 of the poll. The reviewers can answer questions 143 by selecting an appropriate answer choice and submitting the answers via a submit button 139. In the illustrated embodiment, the response choices comprise a "yes" or a "no" type of a response or a multiple-choice with answers such as "never," "rarely," "sometimes," or "frequently" or other preset answers. In another embodiment, the response choices may comprise a free-form text field so as to allow reviewers to enter short answers therein.

To add one or more poll questions to an existing poll, the reviewers can enter a title of the poll 199 that the user wants to add new questions to; and add new poll questions 200 by entering a question and answer choices. It is contemplated that the new poll questions are questions asked in addition to the initial profile questions to complete the reviewer's account and further define the user's preferences. Once a new question is added, the reviewers can activate an "add question to poll" button to save the question, so that the question is added to the poll and made accessible and/or visible to other reviewers.

Figure 5:
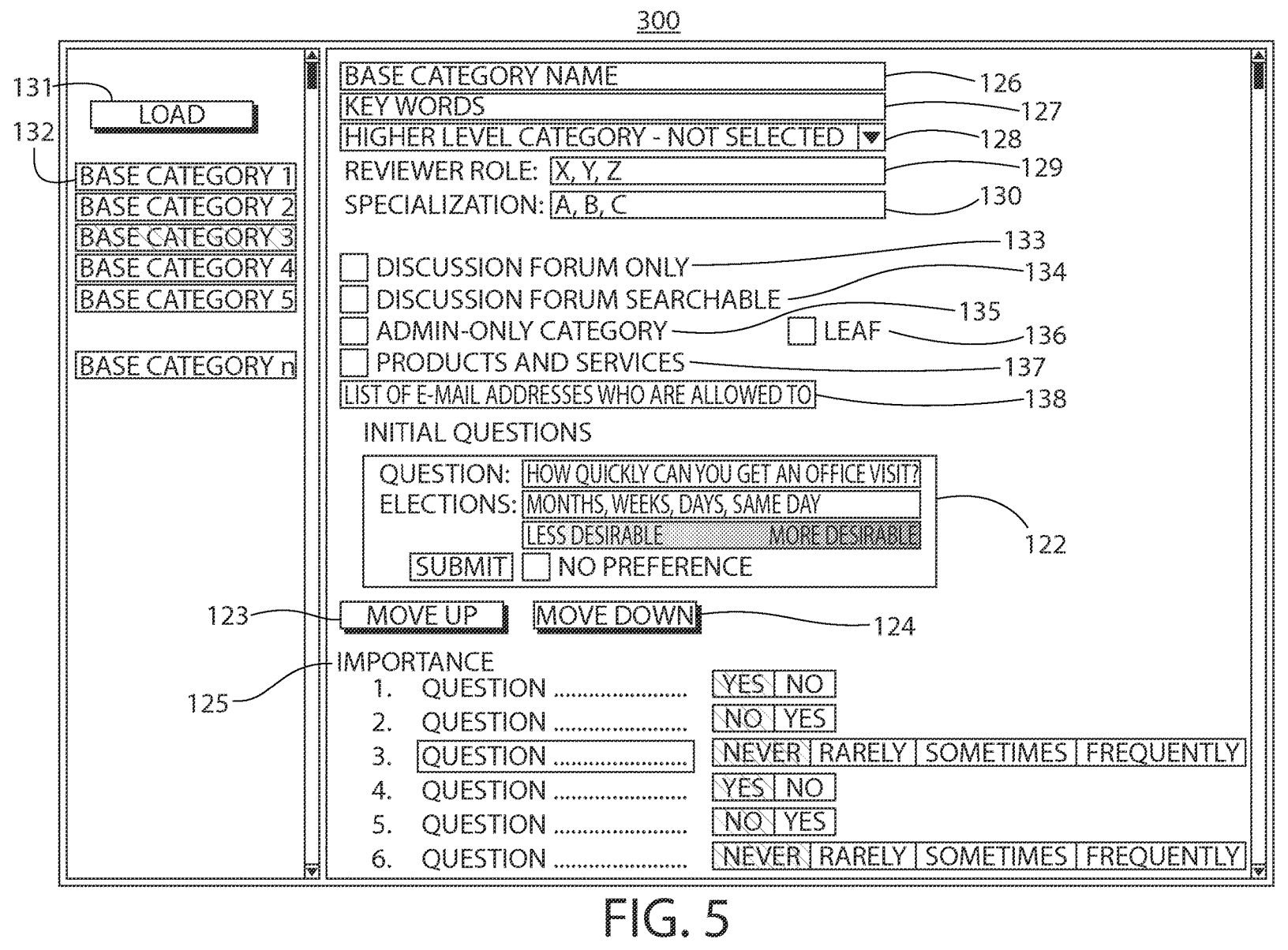

Referring now to FIG. 5, there is shown an exemplary web page 300 for base category definition. A method for entering a base category definition includes the steps of entering a base category name 126 such as a restaurant, school, or medical providers (e.g., doctors), entering key words 127, selecting a higher-level category 128 such as hospital, and specifying reviewer roles 129. In the illustrated embodiment, the reviewer roles 129 may be manually entered. Alternatively, it is contemplated that the roles for some or all of the reviewees may be automatically populated based on several factors. Without limitation, the factors comprise the base category name 126, the key words 127 entered, the higher level category selected 128, the type of goods and/or services that the reviewee provides, the type of business, the type of industry, and marketing channels, among others.

In this regard, if a reviewee is a doctor, the reviewer role may be a patient, a parent, another doctor, or an administrator, as depicted in FIG. 6. Similarly, if the reviewee is a tutor, the web page provides the choices of a student, a parent, a teacher, or the like for the reviewer. Alternatively, the reviewer roles may be manually input by the reviewer who is completing the review.

The technique for entering base category definition further includes controlling the accessibility of the base category. This can be accomplished by specifying whether the base category should be available as a discussion forum only 133, discussion forum searchable 134, admin-only category 135, leaf 136, products and services 137. Additionally, identifying information such as the email addresses of individuals who are allowed to access the base category 138 can be entered.

Thereafter, initial poll-based review questions 122 can be submitted by entering questions and answers or elections. The answers or elections can be provided or selected in a form of a short response or designated on a scale. Additionally, the answers can be tagged with a desirability scale to indicate increasing desirability of the question. It is contemplated that more desirable the question, the higher it is rated via a star rating system. After a question is added, it can be moved up or moved down so that it is reordered on a list of questions 125 via a move up button 123 or a move down button 124, respectively. In this way, the questions can be displayed in a ranking order that is unique to each reviewer. Once the base category is complete, it can be loaded to the list of base categories 132 when a load button 131 is activated.

FIG. 6 shows an exemplary web page 500 for entering poll-based reviews and entering review ranking. The technique for entering poll-based reviews may comprise the steps of entering a review date 147 and a reviewer role 148. In the illustrated embodiment, the reviewer can enter his or her role by selecting one of the choices provided. Thereafter, the reviewer can input opinions or comments in a free-form text field 149. In addition to providing an opinion or a comment, the reviewer can answer poll-based questions provided on the web page 500 by selecting an answer associated to each question.

The order of the poll-based review questions 152 may be altered. In order to change the order of the questions 152, the reviewer can select a question that he or she wishes to reorder. The reviewer can activate the "move up" button 150 to move the question towards the top or the "move down" button 151 to move the question towards the bottom. This process is repeated until the questions are listed in the order to the reviewer's liking In this way, the user can assign ranking to each question based on the question's importance to the user. Once the reviewer has completed the review, he or she can activate the submit button 145 to submit the review.

Figure 7:
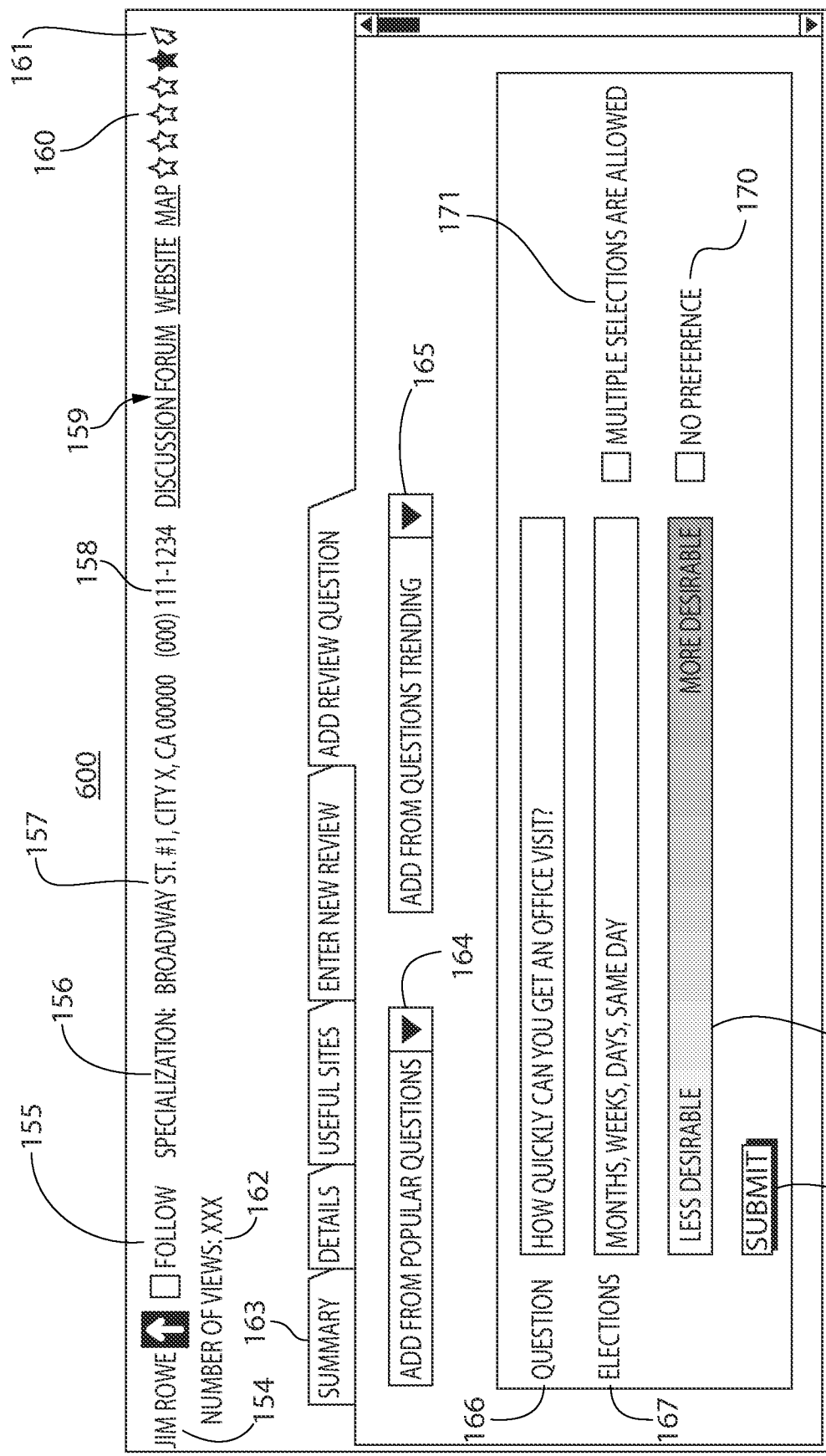
FIG. 7 depicts an exemplary web page for entering new poll-based review questions.

Referring now to FIG. 7, there is shown an exemplary web page 600 for entering new poll-based review questions. The web page 600 includes the reviewee's information, such as the reviewee's name 154, a link to follow or subscribe to 155 the reviewee, specialization, address, phone number, link to additional information about the reviewee 159 such as a third party website, a discussion forum, a map, or the like. Additionally, the reviewee's review information is summarized as a star rating 160 and rating trend 161, which is shown as an indicator arrow. In some embodiments, the number of views 162 of the web page 600 may also be shown.

The GUI of the web page 600 further comprises a plurality of sub tab menus 163, wherein one of the sub tabs is for adding review questions. In this way, the present invention provides open-source polling and can capture most relevant feedback from each reviewer. Under the tab for adding review questions, the reviewer is initially given the option of adding a question from a list of popular questions 164 asked by other reviewers and/or adding a question from a list of trending questions 165. It is contemplated that the popular questions 164 are the questions that are ranked as one of the most important or desirable questions by the most number of reviewers. Additionally, it is contemplated that the trending questions 165 are the questions that move from the bottom of the list to the top of the list at the fastest rate in a given amount of time. In the illustrated embodiment, the option of adding a popular question or a trending question is provided via drop down menus.

Alternatively, the reviewer can add his or her own question 166 and answer choices 167. If the question is a multiple-choice question, the reviewer can select whether multiple answer selections 171 are allowed. Depending on the type of the question asked, the reviewer could indicate a desirability scale 168 for answers. If the answer to the question is more desirable, the answer is given the maximum number of stars and moved towards the top of the list of the review questions. On the contrary, if the answer to the question is less desirable, the answer is given the minimum number of stars and moved towards the bottom of the review questions. If the scale is not applicable, the reviewer can select an option 170 for omitting answering on the scale. If the question is not rated then it may be given the minimum number of stars or a predetermined number of stars, depending upon embodiment. When the reviewer activates a submit button 169, the question is saved and made available to other reviewers to answer.

Once a review is completed, it is summarized such that the best ranking questions or the most desirable answers to the questions are positioned at the top of the list. It is preferred that all questions are listed so as to allow the reviewer to access all of the poll-based review questions. The method of computing a summary rating of each question for each reviewer comprises the steps of determining a reviewer answer for each question, computing a star rating for each reviewer answer based on the desirability, relevance, importance, and/or similar factors, and calculating the average of star rating for each reviewer answer to the question. The least desirable reviewer answer is given zero stars or a minimum number of stars; and the most desirable reviewer answer is given five stars or a maximum number of stars. For example, the most desirable answer may be given five star ratings, and the least desirable answer may be given zero star ratings. The reviewee's overall summary rating is then computed by averaging the star ratings of each question answered by the reviewers.

Summary rating can be uniquely customized for each reviewer so that the summary rating substantially reflects the reviewer's profile and preferences. This is accomplished by taking into account only the reviews that are the most relevant and important to the reviewer. Additionally, a correlation factor is computed between the user and the reviewer. If the correlation is above a predetermined threshold, the review is used in the computation of summary rating. The correlation is computed by computing how similar the user and reviewer are in terms of their profiles, answers to polls, and rankings of poll-based review questions.

Figure 8:
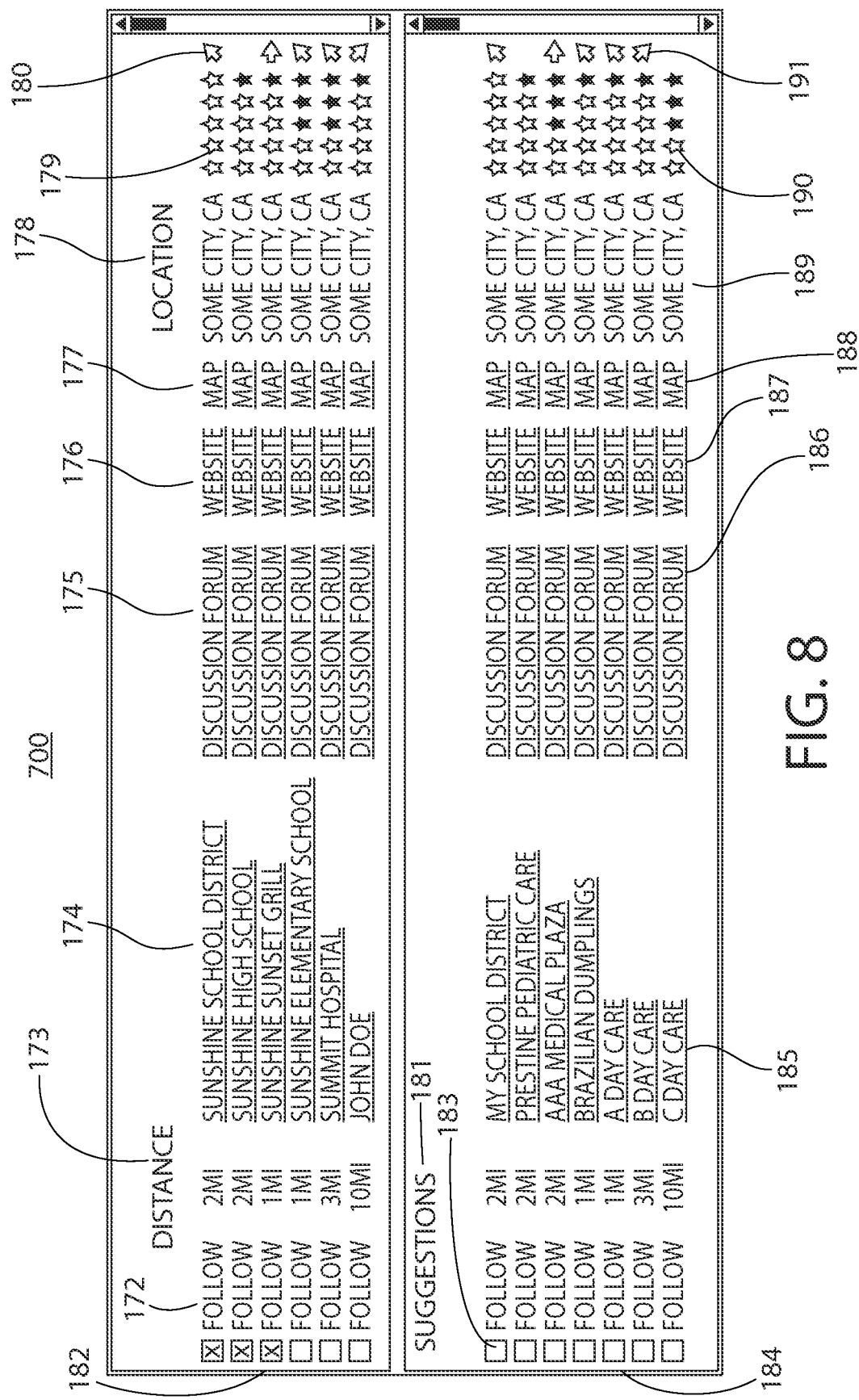
FIG. 8 shows an exemplary web page for suggesting various vendors and service providers based on reviewer preferences.

Referring now to FIG. 8, there is shown an exemplary web page 700 for displaying search results for merchants and service providers, and suggestions related to user-requested search. The reviewee information may be shown such that the web page 700 comprises a first section 182 for displaying the reviewees 174 that are matching the search query input by a user; and a second section 184 for displaying suggested reviewees 185 not perfectly matching the user's specific search but still relevant to the user's search and user's profile.

A marker, such as an upward arrow 180 or a downward arrow 191, may indicate any changes in each reviewee's overall summary rating 179, 190. If there are no changes, no markers are used. Similarly, if the change is negligible and/or the change in rating does not exceed the predetermined threshold, no change is indicated. In addition to the star rating 179, 190, the GUI shows other information such as a link to follow or subscribe to 172 the reviewee; the distance 173 between the reviewee and the reviewer's location; a link to the reviewee's discussion forum 175, 186; a link to the reviewee's website 176, 187; and a link to a map 177, 188 for navigation.

The search is based on a non-fixed weighing mechanism using the data from the reviewer's profile and poll questions. The non-fixed weighing mechanism assigns a predetermined number of points for each topic in the reviewer's profile or for each topic related to a poll question. For example, the weighing mechanism assigns ten points for a topic such as a zip code. If a reviewee's zip code matches the reviewer's zip code, then a reviewee is allocated all ten points. Alternatively, if the reviewee's zip code is located beyond a predetermined distance from the reviewer's zip code, then the reviewee is allocated zero points or less than ten points.

In another instance, the weighing mechanism assigns three points for a household with children between the ages of six to twelve. If a reviewee provides products and/or services relevant to elementary school children, the reviewee is given three points. Thus, the amount of points a reviewee is given directly correlates to relevance to the reviewer; and the correlation is positive for matching abstracted profile information, matching poll answers, and matching review ranks. The search can combine a plurality of topics to generate search output (e.g., zip code and household size). The reviewees 185 may then be listed in the order of the most number of points to the least number of points, wherein the points correspond to relevance or best-fit to the reviewer.

Moreover, search for reviewees may be controlled by an administrative console. For example, the administrative console can preset settings to search preschool to reviewers having one or more household members between the ages of three to five years old. Additionally, the administrative console can preset settings to always search certain services that are applicable to a wide range of consumers, such as restaurants, laundry service, house cleaning, and the like.

The suggested reviewees 185 are automatically populated using a suggestion creation method. The technique for suggestion creation method related to search results includes the steps of determining the results of the search; finding the categories of reviewees that matched the original search; then re-searching any reviewees in these categories; and displaying results to the user. For instance, the results of the search may comprise a list of that provide restaurant services. The suggestion creation method would then look into the category of restaurants and retrieve information relating to reviewees that is relevant to the user's original search and profile. Any duplicates of reviewees that appear more than once under multiple categories are removed. The retrieved information is then displayed in the second section 184 for the user's reference.

FIG. 9 shows an exemplary web page 800 for providing announcements, poll questions, and general suggestions based on reviewer preferences. In some embodiments, the web page 800 acts as the home page for reviewers upon logging on. The top portion 192 of the web page 800 provides a welcome message or greeting with a general notification, such as a number of new, unread messages to the reviewer. The web page 800 further provides more detailed announcements 193 for updates on reviews or on administrative changes that affect the reviewer.

In the illustrated embodiment, the web page provides a quick poll 194 for ensuring that reviewer preferences are updated regularly. Generally, the quick poll 194 comprises few questions so that the reviewer can answer them without spending excessive amount of time. The questions in the quick poll 194 are the questions that may be asked in addition to the initial profile questions to complete the reviewer's account. The answers from the quick poll 194 are stored in the database and used for the suggestion creation method and customized star rating method.

While the present invention provides suggestions for reviewees based on the suggestion creation method as described above, it can also populate a list of reviewees 195 not based on the search creation method. In this way, the present invention allows reviewers to follow or subscribe to reviewees that are based on their profile.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A non-transitory computer storage medium, comprising executable instruction, which when executed by a computer, cause said computer to:
   create a reviewer account, wherein said reviewer account is associated with a reviewer, the reviewer being a prospective one of one or more contributors of review content;
   receive a review pertaining to a reviewee, wherein said review comprises at least one open-source poll-based review question and a response thereto, wherein said at least one open-source poll-based review question is contributed by one or more of said reviewers or reviewees;
   sort said at least one open-source poll-based review question based at least in part in order of a reviewer's preference, wherein each of said at least one open-source poll-based review question is rated by said reviewer;
   calculate a summary rating for said reviewee, based at least in part on said review and the response to the at least one open-source poll-based review question; and
   transmit said summary rating for said reviewee for display to a user.

2. The non-transitory computer storage medium of claim 1, wherein said at least one open source poll-based review question is associated with a product or service provided by said reviewee.

3. The non-transitory computer storage medium of claim 1, wherein the instructions causing the computer to calculate a summary rating for said reviewee further cause the computer to calculate a summary rating that is customized for each said reviewer.

4. The non-transitory computer storage medium of claim 3, wherein the customized summary rating is based at least in part upon responses to each of said at least one open-source poll-based review questions by reviewers having a correlation factor with a user viewing the summary rating that is above a predetermined threshold.

5. The non-transitory computer storage medium of claim 1, further comprising instructions for receiving new open-source poll-based review questions contributed by one or more contributors of review content.

6. The non-transitory computer storage medium of claim 1, wherein said reviewer's preference is based at least in part on reviewer profile abstracted information, said reviewer profile abstracted information comprising a reviewer's demographic information.

7. The non-transitory computer storage medium of claim 1, wherein said reviewer's preference is based at least in part on a poll profile, said poll profile comprising information pertaining to a reviewer derived from polls.

8. The non-transitory computer storage medium of claim 1, wherein said reviewer's preference is based at least in part on a review profile, said review profile comprising information pertaining to said review completed by said reviewer.

9. The non-transitory computer storage medium of claim 1, further comprising instructions for conducting polls to obtain additional information pertaining to said reviewer's preference and said reviewer account.

10. The non-transitory computer storage medium of claim 9, further comprising instructions for receiving new questions for said polls via a website.

11. The non-transitory computer storage medium of claim 1, further comprising instructions to transmit, to the reviewer for display, a list of suggested reviewees based at least in part on said reviewer's preference and said reviewer account.

12. The non-transitory computer storage medium of claim 1, further comprising instructions for summarizing said review to provide said summary rating for said reviewee by determining an average of a rating of each of said at least one open-source poll-based review questions and determining an overall average of said average of said rating of each of said at least one open-source poll-based review questions.

13. The non-transitory computer storage medium of claim 1, wherein said at least one open-source poll-based review question is contributed by the reviewer.

14. A computer-implemented method for creating and providing reviews, the method comprising the steps of:
   creating a reviewer account, wherein said reviewer account is associated with a reviewer, the reviewer being a prospective one of one or more contributors of review content;
   receiving a review pertaining to a reviewee, wherein said review comprises at least one open-source poll-based review question and a response thereto, wherein said at least one open-source poll-based review question is contributed by one or more of said contributors of review content;
   sorting said at least one open-source poll-based review question based at least in part in order of a reviewer's preference, wherein each of said at least one open-source poll-based review question is rated by said reviewer;

summarizing said review to provide a summary rating for said reviewee; and displaying said summary rating to a user.

15. The method of claim 14, in which the step of summarizing said review to provide a summary rating for said reviewee comprises:

calculating a summary rating for said reviewee that is customized for each said reviewer.

16. The method of claim 15, wherein the customized summary rating is based at least in part upon responses to each of said at least one open-source poll-based review questions by reviewers having a correlation factor with a user viewing the summary rating that is above a predetermined threshold.

17. The method of claim 14, further comprising the step of receiving new open-source poll-based review questions contributed by at least one of said one or more contributors of review content.

18. The method of claim 14, wherein said reviewer's preference is based at least in part on one or more of: (a) reviewer profile abstracted information, said reviewer profile abstracted information comprising a reviewer's demographic information; (b) a poll profile, said poll profile comprising information pertaining to a reviewer derived from polls; and (c) a review profile, said review profile comprising information pertaining to said review completed by said reviewer.

19. The method of claim 14, further comprising the step of: conducting polls to obtain additional information pertaining to said reviewer's preference and said reviewer account.

20. The method of claim 14, further comprising the step of transmitting, to the reviewer for display, a list of suggested reviewees based at least in part on said reviewer's preference and said reviewer account.

* * * * *